United States Patent
Huang et al.

(10) Patent No.: US 8,849,943 B2
(45) Date of Patent: Sep. 30, 2014

(54) USING MULTI-RESOLUTION VISUAL CODES TO FACILITATE INFORMATION BROWSING IN THE PHYSICAL WORLD

(75) Inventors: Qingfeng Huang, San Jose, CA (US); James E. Reich, San Francisco, CA (US); Marc E. Mosko, Santa Cruz, CA (US); Victoria M. E. Bellotti, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 2357 days.

(21) Appl. No.: 11/312,825

(22) Filed: Dec. 19, 2005

(65) Prior Publication Data

US 2007/0143737 A1  Jun. 21, 2007

(51) Int. Cl.
*G06F 15/16* (2006.01)
*G06K 19/06* (2006.01)
*G06K 7/14* (2006.01)

(52) U.S. Cl.
CPC ............ *G06K 7/14* (2013.01); *G06K 19/06056* (2013.01)
USPC ............................ 709/217; 235/456; 235/494

(58) Field of Classification Search
USPC .................................. 235/456, 494; 709/217
See application file for complete search history.

(56) References Cited

U.S. PATENT DOCUMENTS

| | | | | |
|---|---|---|---|---|
| 4,339,182 A | * | 7/1982 | Ueda et al. | 353/27 R |
| 5,153,418 A | * | 10/1992 | Batterman et al. | 235/494 |
| 5,241,166 A | * | 8/1993 | Chandler | 235/494 |
| 5,486,686 A | * | 1/1996 | Zdybel et al. | 235/375 |
| 5,818,032 A | * | 10/1998 | Sun et al. | 235/494 |
| 5,987,459 A | * | 11/1999 | Swanson et al. | 707/6 |
| 6,032,861 A | * | 3/2000 | Lemelson et al. | 235/456 |
| 6,330,976 B1 | * | 12/2001 | Dymetman et al. | 235/487 |
| 6,398,117 B1 | * | 6/2002 | Oakeson et al. | 235/494 |
| 6,457,651 B2 | * | 10/2002 | Paul et al. | 235/494 |
| 6,641,053 B1 | * | 11/2003 | Breidenbach et al. | 235/494 |
| 7,225,991 B2 | * | 6/2007 | Jones et al. | 235/487 |
| 2001/0001473 A1 | * | 5/2001 | Tsi et al. | 235/472.01 |
| 2001/0050308 A1 | | 12/2001 | Paul | |
| 2003/0121980 A1 | | 7/2003 | Lemelson | |
| 2005/0139680 A1 | * | 6/2005 | Anttila et al. | 235/462.46 |
| 2005/0269416 A1 | * | 12/2005 | Sussmeier et al. | 235/494 |
| 2006/0097062 A1 | * | 5/2006 | Cheong et al. | 235/494 |

FOREIGN PATENT DOCUMENTS

WO     03060626 A2     7/2003

\* cited by examiner

*Primary Examiner* — Saleh Najjar
*Assistant Examiner* — Peiliang Pan
(74) *Attorney, Agent, or Firm* — Shun Yao; Park, Vaughan, Fleming & Dowler LLP

(57) ABSTRACT

One embodiment of the present invention provides a system for navigating through information associated with physical objects or locations. During operation, the system detects a multi-resolution visual code placed on or in the vicinity of a physical object or location. The system then determines a level of resolution for the detected code, and decodes the code at the determined level of resolution to obtain the information. Subsequently, the system presents the information to a user, thereby allowing the user to navigate through information associated with the physical object or location.

18 Claims, 5 Drawing Sheets

USING MULTI-RESOLUTION VISUAL CODES TO FACILITATE INFORMATION BROWSING IN THE PHYSICAL WORLD

BACKGROUND

1. Field of the Invention

Embodiments of the present invention relate to techniques for information browsing. More specifically, embodiments of the present invention relate to a method and an apparatus for using multi-resolution visual codes to facilitate navigating through information associated with objects in the physical world.

2. Related Art

The Internet has proven to be a nearly unlimited source of information. Various web-based applications provide convenient ways for a user to browse and navigate through online information. Nowadays, almost every organization maintains a web page, and a user can effortlessly navigate through such online information and quickly locate web pages containing specific information.

Although it is presently very easy to browse for information associated with objects and items which are represented online, it is not always easy to browse for information associated with objects that exist in the physical world. While a user can access a web page from anywhere in the world, such access requires at least an Internet connection, an input device, and an output device. In addition, a user needs to associate an information identifier, such as a uniform resource locator (URL), with the subject of interest, and must somehow input this identifier into a communication device to look up the related information. This is inconvenient for a user without easy access to a computer system.

For example, suppose a tourist who is traveling through a city sees the city's opera house and wishes to obtain information about the upcoming events. If the tourist does not have access to a computer with Internet connection, the tourist can only obtain a hard copy of the program booklet from the opera house, if such a hard copy is available. Note that distributing information associated with physical objects by distributing hard copies of the information is both costly and inefficient. Currently, there is no system that allows a user to easily browse and navigate through information associated with physical objects.

Hence, there is a need for a method and an apparatus for efficiently browsing through information associated with objects in the physical world.

SUMMARY

One embodiment of the present invention provides a system for navigating through information associated with physical objects or locations. During operation, the system detects a multi-resolution visual code placed on or in the vicinity of a physical object or location. The system then determines a level of resolution for the detected code, and decodes the code at the determined resolution level to obtain the information. Subsequently, the system presents the information to a user, thereby allowing the user to navigate through information associated with the physical object or location.

In a variation of this embodiment, the multi-resolution visual code is viewable from a variety of distances and provides multiple levels of resolution. Additionally, a code at each level of resolution encodes information corresponding to a different level in an information hierarchy.

In a further variation, the multi-level visual code is a multi-level DataGlyph code. In this DataGlyph code, glyphs at a high-resolution level of the multi-resolution visual code form pixels or halftone cells for glyphs at a low-resolution level which is viewable from a longer distance.

In a further variation, the system retrieves additional information associated with the code from a remote data source via a network.

In one variation of this embodiment, presenting the information involves displaying a user interface, and allowing the user to select a portion of the code at a resolution level that is higher than the present level of resolution.

In a further variation, the user interface displays information associated with different portions of the higher-resolution code to assist the user in the selection.

In one variation of this embodiment, the system detects additional parameters of the physical object or the environment in which the physical object resides.

In a further variation, the additional parameters include the location of the multi-resolution visual code in relation to the physical object or location.

In one variation of this embodiment, the system performs error detection for a low-resolution code based on the information encoded by a high-resolution code, thereby allowing errors due to decoding or due to physical damage to the low-resolution code to be corrected.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs).

Embodiments of the present invention use tags placed on or in the vicinity of a physical structure to encode relevant information. For example, a tag can be a sign, a banner, or any visually identifiable marks. The encoded information can include texts, digits, and graphics, and can be associated with the physical structure. A user uses a decoding device to detect the tag and to decode the code on the tag. This decoding device further presents the decoded information to the user and allows the user to determine how to navigate using the information.

In one embodiment, a tag includes a multi-resolution visual code to encode information. Different levels of resolution encode different levels of detail or aspects of the information. For example, a multi-resolution tag, when viewed from a distance of 25 feet, may appear to be a four-bit code describing the general class of tag represented, such as an event, a mobile object, or a person. When viewed from a closer distance, for example, 10 feet, the code can be decoded at a higher resolution and the user can obtain more specific information by using a camera-based decoding device. The user can further decrease the distance between the decoding device and the tag to reveal more details of the code and obtain more information.

Information Browsing Using Multi-Resolution Tags

Figure 1:
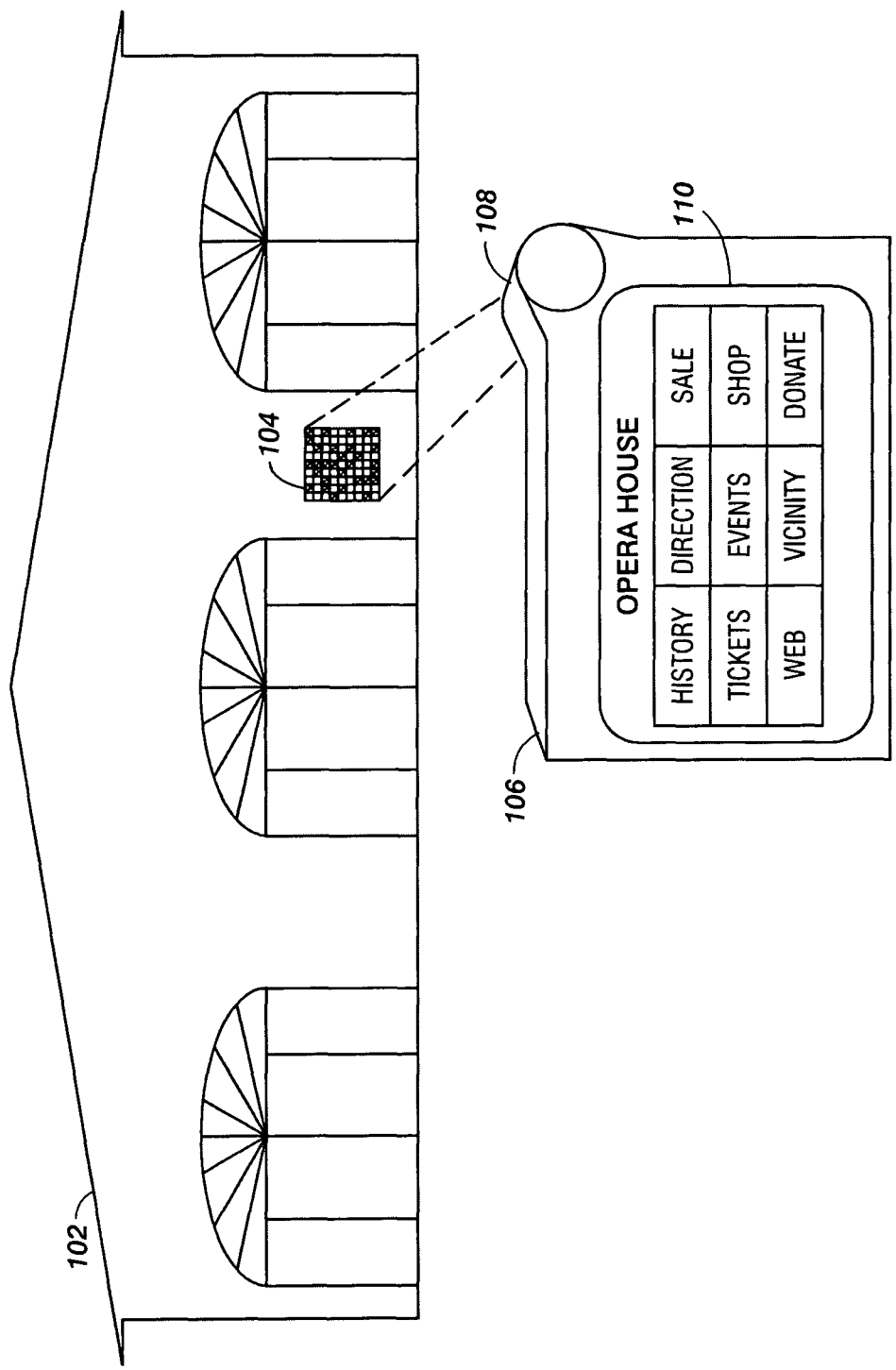
FIG. 1 illustrates how a user can use a decoder to obtain information about a physical object which is encoded in a multi-resolution visual code in accordance with one embodiment of the present invention.

In one embodiment of the present invention, a tag carrying a multi-resolution visual code can be placed on or near a physical structure, such as on a building, outside a shop, or on a wall. A user can observe the tag with a viewing and decoding device. FIG. 1 illustrates how a user can use a decoder to obtain information about a physical object which is encoded in a multi-resolution visual code in accordance with one embodiment of the present invention. In this example, a physical structure 102 has a tag 104 on its front façade. Tag 104 presents a multi-level resolution code that can be viewed from a distance. Any type of visual code, including one-dimensional code such as a bar code, and two-dimensional code, can be used in a way that exhibits multiple levels of resolution.

A user in the vicinity of physical structure 102 can detect the tag by using a decoding device 106. In one embodiment, the decoding device 106 includes a user interface 110 and a lens 108 which preferably provides a zoom function. When the user aims lens 108 at tag 104, decoding device 104 can capture and decode the multi-resolution visual code at the lowest level of resolution. FIG. 1 shows a two-dimensional multi-resolution visual code. Based on the decoded information, decoding device 106 can display a user interface 110 to the user to present related information based on the code, which assists the user in navigating using the information.

In general, a low-resolution code may contain a number of portions of high-resolution code, wherein each portion of the high-resolution code is within a different area on the tag. The low-resolution code can provide information indicating which areas on the tag carry specific information. In the illustrated example, the code on the low-resolution level on tag 104 indicates that there are nine areas on the tag, each of which contains a high-resolution code encoding a different type of information. In one embodiment, user interface 110 displays the location of each area and the type of information carried by the high-resolution code within each area. The user can then select one of the subjects by focusing decoding device 106 on the corresponding area, so that decoding device 106 can decode the high-resolution code in the corresponding area. In one embodiment, the user can perform a "zoom-in" operation to focus decoding device 106 on the desired area. In a further embodiment, the user can physically move closer to tag 104. Both approaches achieve the same effect, which is to allow decoding device 106 to decode the code at the desired level of resolution.

In one embodiment of the present invention, the code at each level of resolution also encodes information about the current level of information. This "level information" allows decoding device 106 to identify the current level in the information hierarchy, and helps the user navigate through the information more easily. In a further variation, decoding device can store previously visited levels in a local memory and allow the user to go back to a level corresponding to a lower resolution.

The multi-resolution visual code on tag 104 can include many types of information. For example, if physical structure 102 is an opera house, the lowest-resolution code on tag 104 can provide a variety of information about the opera house. Such information can be directly encoded in the code. In a further embodiment, the code can provide a URL link and, if decoding device 106 has Internet access, the user can navigate to that URL link by focusing decoding device 106 on the area corresponding to the URL link.

Because a tag can be placed outside a building, sometimes a tag can become worn or tainted. As a result, erroneous decoding can occur. In one embodiment of the present invention, a high-resolution code includes error-correction information for a low-resolution code. Further, the system can designate a specific area in the current resolution level, for example, the lower right corner, to carry the error correction code. Other inter-level or intra-level error checking and/or correction configurations are also possible.

In another embodiment, decoding device 106 can use additional environmental cues, in addition to the multi-resolution visual code, to decode the encoded information. For example, decoding device 106 can detect on which side of a building, (i.e., east, west, north, or south), the tag is located. Decoding device 106 subsequently decodes the multi-resolution visual code based on such environmental cues, which in effect increases the information capacity of each level of the code. In a further embodiment, decoding device 106 can include a location detection mechanism, such as a global positioning system (GPS), to assist decoding.

One advantage of embodiments of the present invention is that minimal manual input is required from the user. The user can navigate through the information by focusing on different areas to decode high-resolution code. The navigation process does not require a user to manually input a URL for the observed object. Furthermore, because the substantive information can be directly encoded in the tag, the user can obtain the information without accessing the Internet.

Multi-Resolution Visual Codes

Figure 2:
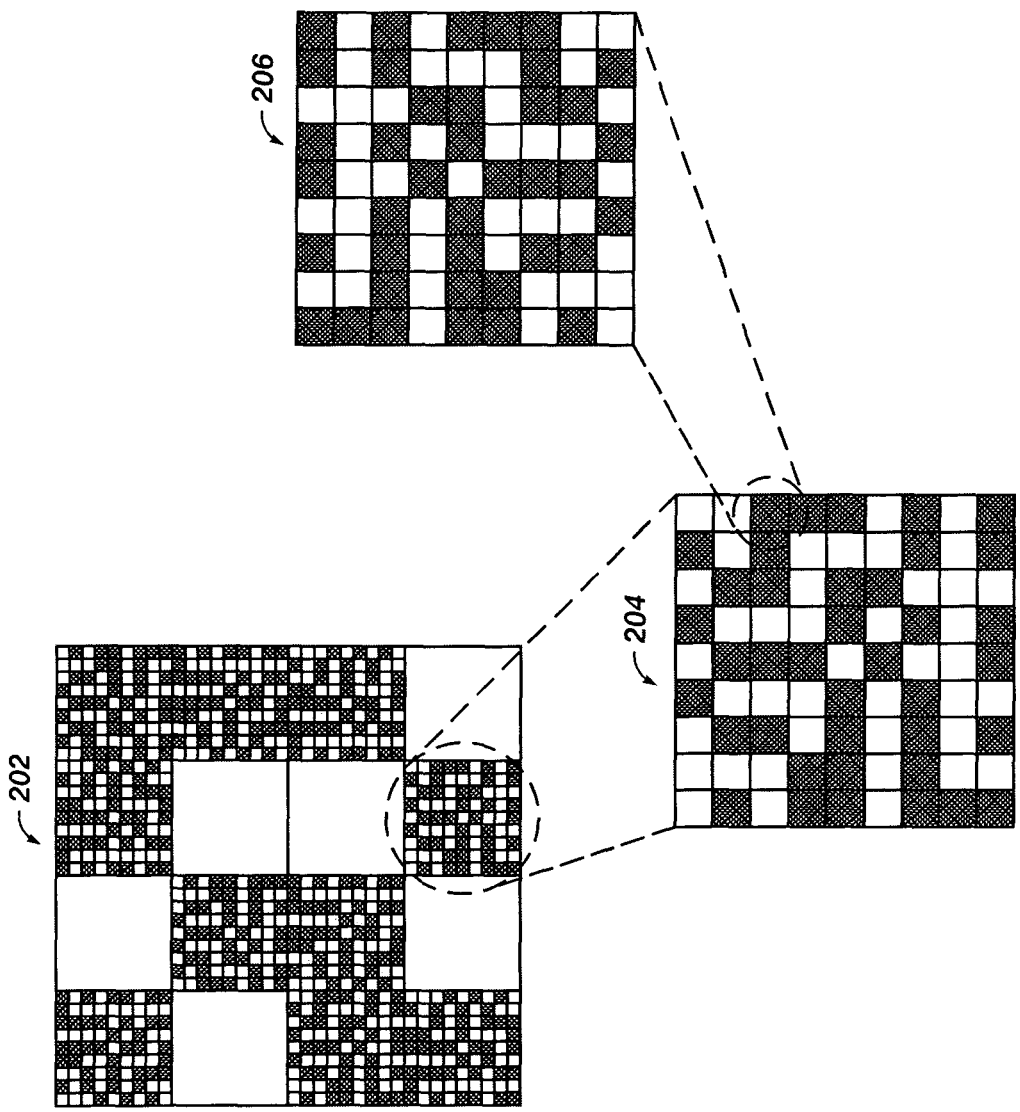
FIG. 2 illustrates an exemplary two-dimensional multi-resolution visual code, which can be used to encode information on a tag placed on a physical structure, in accordance with one embodiment of the present invention.

Embodiments of the present invention can use a variety of multi-resolution visual codes. FIG. 2 illustrates an exemplary two-dimensional multi-resolution visual code, which can be used to encode information on a tag placed on a physical structure, in accordance with one embodiment of the present invention. The illustrated example includes three resolution levels. A lowest-resolution code 202 encodes general information. Such information may include object type (such as building), event, organization, and people. As is illustrated in FIG. 2, code 202 contains 16 squares. Each square represents one bit. For example, a light-colored square represents a "0," and a dark-colored square represents a "1." Therefore, code 202 can theoretically encode 64 K possible values. In one embodiment, code 202 encodes information relating to the high-resolution codes within the tag. When a user's decoding device successfully decodes this information, the decoding device can present a user interface showing the subject matter of each portion of the high-resolution code associated with the corresponding areas. The user can subsequently choose one of these areas to focus on.

As is illustrated in FIG. 2, code 202 is divided into 16 squares, wherein each square contains a portion of a high-resolution code, such as code 204. In other embodiments, multiple squares in code 202 can constitute an area for the high-resolution code. For example, code 202 can be divided into four areas wherein each area includes four squares. Other area-division approaches are also possible.

Code 204 has a similar pattern as code 202, and can encode more specific, detailed information. In this example, code 202 has 81 squares, and can theoretically encode $2^{81}$ possible values. In one embodiment, code 204 can include error checking or correction code for code 202. Code 204 also encodes information about the subject matter contained in different code portions of the next level of resolution, and the corresponding areas for these portions.

Each square in code 204 further contains a code at a higher resolution, such as code 206. Code 206 can encode yet more detailed information that is at the most detailed level of the information hierarchy. Furthermore, code 206 can also contain error checking or correction information for code 204.

Figure 3:
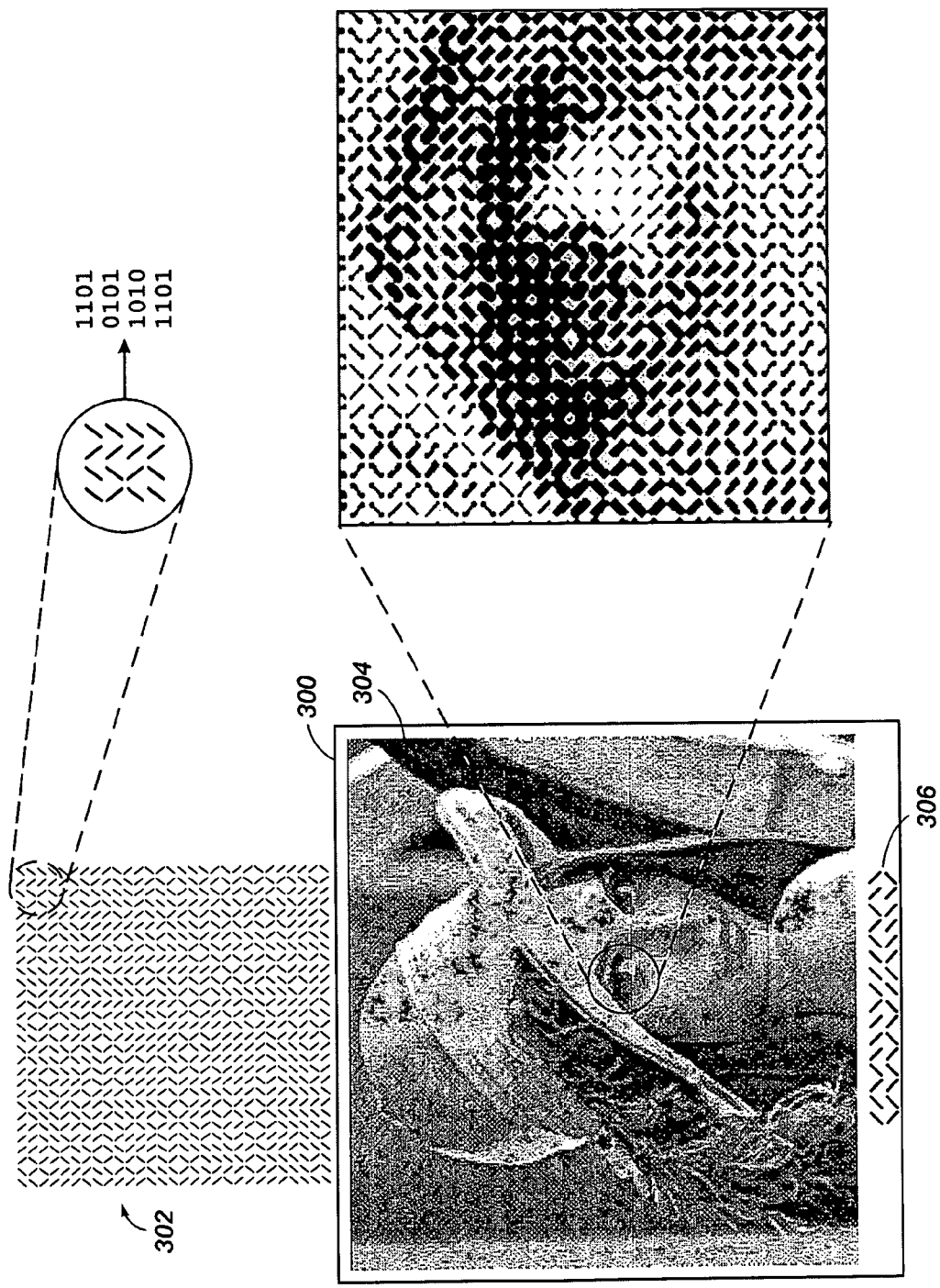
FIG. 3 illustrates how DataGlyphs can be implemented in multiple resolution levels to encode information in accordance with one embodiment of the present invention.

In additional embodiments, the multi-resolution visual code can by based on DataGlyphs. FIG. 3 illustrates how DataGlyphs can be implemented in multiple resolution levels to encode information in accordance with one embodiment of the present invention. A DataGlyph 302 encodes information such as text, data, and graphics, in large numbers of small glyphs. Each glyph typically is a 45-degree diagonal line, as short as one one-hundredth of an inch or less, depending on the resolution. A glyph represents a single binary digit, based on the glyph's orientation. The glyphs are typically laid down in groups on a regular, finely spaced grid forming unobtrusive, evenly textured gray areas. Although individual glyphs can be large enough to be resolved by the human eye, in groups the glyphs form a pleasing pattern that is not distracting.

In addition to the data, each DataGlyph can contain an embedded synchronization lattice or skeleton, which is a repeating fixed pattern of glyphs that marks the DataGlyph's boundaries and serves as a clocking track to improve the reliability of reading. Groups of glyphs, representing bytes of data, are laid down within this frame work. The data can be grouped into blocks of a few dozen bytes each, and error-correction code can be added to each block.

In one embodiment of the present invention, a tag for a physical object can use DataGlyphs as the underlying visual code, so that the tag can simultaneous display a different pattern, such as regular text or graphics. As is illustrated in FIG. 3, a tag 300 includes a low-resolution DataGlyph 306 and a graphic design 304 which is encoded with high-resolution DataGlyphs. A decoding device can first detect and decode DataGlyph 306 from a distance. The decoding device then display a user interface indicating the categories of information encoded by the high-resolution DataGlyphs and where each category is located on graphic design 300. A user can select one category by zooming into that location or by physically moving closer and focusing the decoding device on that location.

Information Hierarchy

Embodiments of the present invention enable a tag to encode multiple levels of information. With such an information hierarchy, a user's navigation of information in the physical world resembles her Internet-browsing experience, and, hence, can be very intuitive. An information hierarchy can be implemented in many ways and presented in different forms. For example, a user interface listing information categories can use text, graphics, sound, animation, or a combination of different multi-media formats. Such flexibility allows information providers to deliver information much more effectively.

Figure 4:
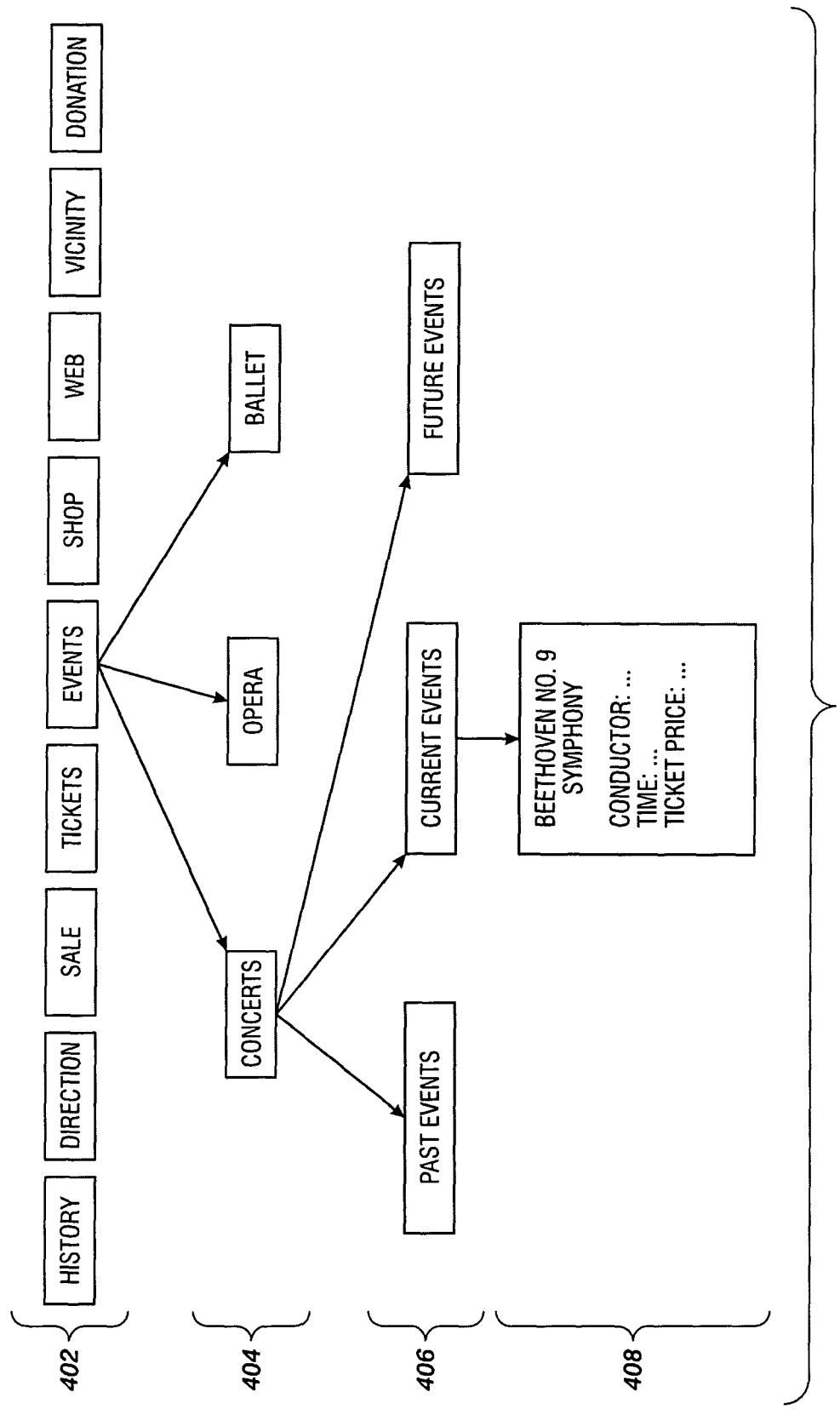
FIG. 4 illustrates an information hierarchy through which a user can navigate in accordance with one embodiment of the present invention.

FIG. 4 illustrates an information hierarchy through which a user can navigate in accordance with one embodiment of the present invention. In this example, the tag contains information about an opera house. Top-level categories 402, which are encoded with the lowest-resolution code, can include general information categories about the opera house, such as "history," "direction," "sale," "tickets," "events," "shop," "web," vicinity," and "donation." Each category corresponds to an area on the tag where a higher-resolution code carries the information for that category.

For example, if the user chooses to focus the decoding device on "events," the next-level user interface displays a corresponding set of sub-categories 404, which include "concerts," "opera," and "ballet." Similarly, the user can navigate to yet another level 406 encoded in higher-resolution code, which includes "past event," "current events," and "future events." If the user chooses "current events," the decoding device can focus on the corresponding area and retrieve detailed information 408 for a current event.

Operation of Decoding Device

Figure 5:
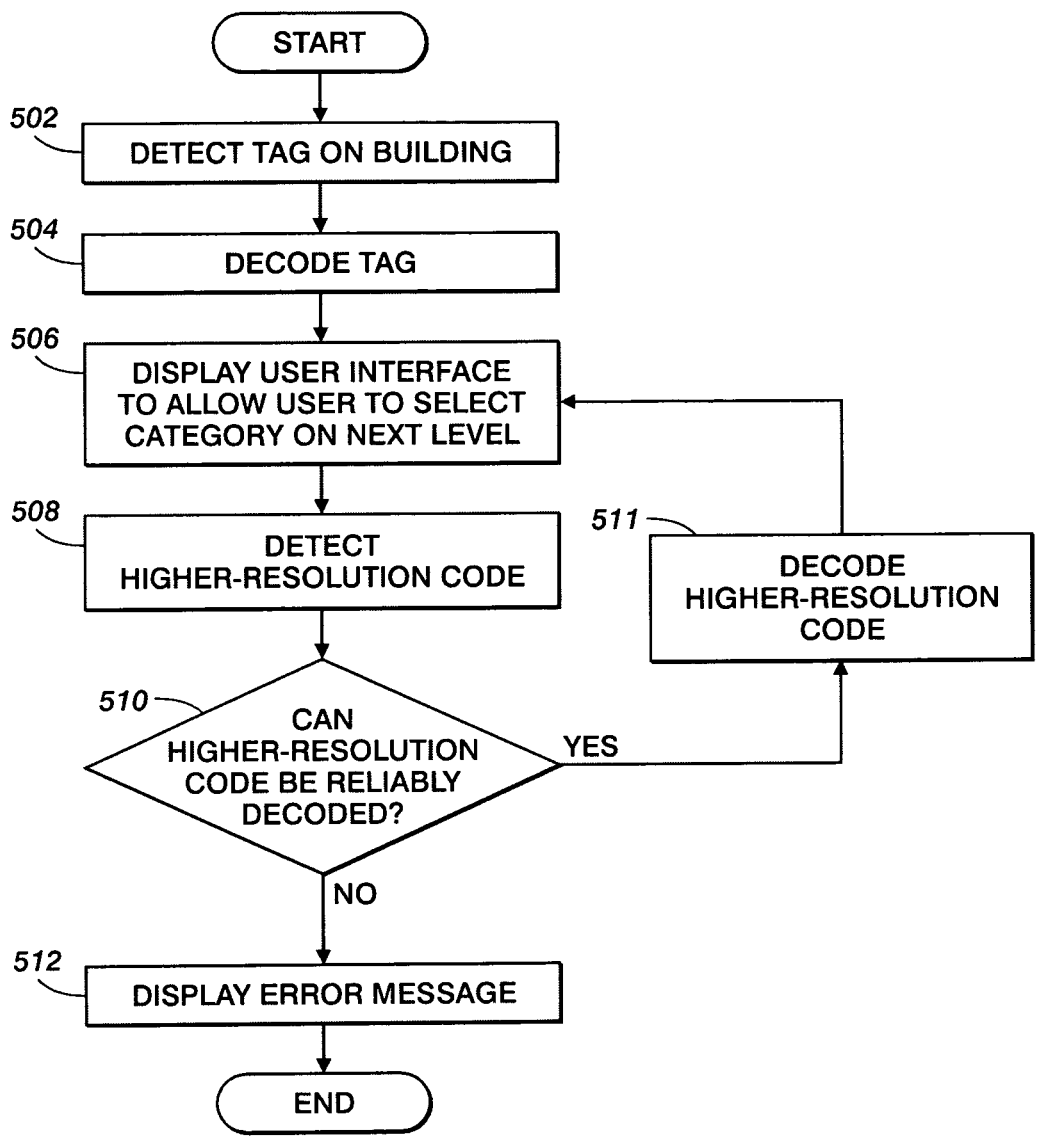
FIG. 5 presents a flow chart illustrating an exemplary process for decoding a multi-resolution visual code to facilitate information browsing in accordance with one embodiment of the present invention.

FIG. 5 presents a flow chart illustrating an exemplary process for decoding a multi-resolution visual code to facilitate information browsing in accordance with one embodiment of the present invention. During operation, a decoding device detects a tag on a building (step 502). Next, the decoding device decodes the tag (step 504), and displays a user interface to allow the user to select an information category on the next resolution level (506).

After the user focuses the decoding device on a selected area on the tag associated with a specific information category, the decoding device detects the corresponding higher-resolution code (step 508). Next, the decoding device determines whether the higher-resolution code can be reliably decoded (step 510). If so, the decoding device decodes the higher-resolution code (step 511), and displays the user interface to allow user to select a category on the next level (step 506). Otherwise, the decoding device displays an error message (step 512) and exits.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for navigating through information associated with physical objects or locations, the method comprising:
    detecting a multi-resolution visual code placed on or in the vicinity of a physical object or location, wherein the multi-resolution visual code encodes a plurality of hierarchical information categories, and wherein each information category corresponds to an area on a tag which includes:
        a low-resolution visual code that encodes general category information, for an information category, using a plurality of information-encoding regions; and
        a high-resolution visual code within at least one information-encoding region of the low-resolution visual code, wherein the high-resolution visual code encodes detailed information corresponding to the information category;

determining a level of resolution for the detected code;

decoding the code at the determined resolution level to obtain information; and presenting the information to a user, thereby allowing the user to navigate through the information associated with the physical object or location, wherein presenting the information involves displaying a user interface to the user that allows the user to select a portion of the code to be decoded at a resolution level that is higher than the present level of resolution.

2. The method of claim 1, wherein the multi-resolution visual code is viewable from a variety of distances and provides multiple levels of resolution, wherein a code at each level of resolution encodes information corresponding to a different category level in an information hierarchy.

3. The method of claim 2, wherein the multi-level visual code is a multi-level DataGlyph code, and wherein glyphs at a high-resolution level of the multi-resolution visual code form pixels or halftone cells for glyphs at a low-resolution level, which is viewable from a longer distance.

4. The method of claim 2, further comprising retrieving additional information associated with the code from a remote data source via a network.

5. The method of claim 1, wherein the user interface displays information associated with different portions of the higher-resolution code to assist the user in the selection.

6. The method of claim 1, further comprising detecting additional parameters of the physical object or the environment in which the physical object resides.

7. The method of claim 6, wherein the additional parameters include the location of the multi-resolution visual code in relation to the physical object or location.

8. The method of claim 1, further comprising performing error detection for a low-resolution code based on the information encoded by a high-resolution code, thereby allowing errors due to decoding or due to physical damage to the low-resolution code to be corrected.

9. An apparatus for navigating through information associated with physical objects or locations, the apparatus comprising:

a processor;

a memory device storing instructions which are executed by the processor; a code-detection mechanism configured to detect a multi-resolution visual code placed on or in the vicinity of a physical object or location, wherein the multi-resolution visual code encodes a plurality of hierarchical information categories, and wherein each information category corresponds to an area on a tag which includes:

a low-resolution visual code that encodes general category information, for an information category, using a plurality of information-encoding regions; and a high-resolution visual code within at least one information-encoding region of the low-resolution visual code, wherein the high-resolution visual code encodes detailed information corresponding to the information category;

a decision mechanism configured to determine a level of resolution for the detected code;

a decoding mechanism configured to decode the code at the determined resolution level to obtain information; and a presentation mechanism configured to present the information to a user, thereby allowing the user to navigate through the information associated with the physical object or location, wherein presenting the information involves displaying a user interface to the user that allows the user to select a portion of the code to be decoded at a resolution level that is higher than the present level of resolution.

10. The apparatus of claim 9, wherein the multi-resolution visual code is viewable from a variety of distances and provides multiple levels of resolution, wherein a code at each level of resolution encodes information corresponding to a different category level in an information hierarchy.

11. The apparatus of claim 10, wherein the multi-level visual code is a multi-level DataGlyph code, and wherein glyphs at a high-resolution level of the multi-resolution visual code form pixels or halftone cells for glyphs at a low-resolution level which is viewable from a longer distance.

12. The apparatus of claim 10, further comprising a communication mechanism configured to retrieve additional information associated with the code from a remote data source via a network.

13. The apparatus of claim 9, wherein the user interface displays information associated with different portions of the higher-resolution code to assist the user in the selection.

14. The apparatus of claim 9, further comprising a second detection mechanism configured to detect additional parameters of the physical object or the environment in which the physical object resides.

15. The apparatus of claim 14, wherein the additional parameters include the location of the multi-resolution visual code in relation to the physical object or location.

16. The apparatus of claim 9, further comprising an error-checking mechanism configure to perform error detection for a low-resolution code based on the information encoded by a high-resolution code, thereby allowing errors due to decoding or due to physical damage to the low-resolution code to be corrected.

17. A non-transitory computer-readable storage medium storing instructions that when executed by a computer cause the computer to perform a method for navigating through information associated with physical objects or locations, the method comprising:

detecting a multi-resolution visual code placed on or in the vicinity of a physical object or location, wherein the multi-resolution visual code encodes a plurality of hierarchical information categories, and wherein each information category corresponds to an area on a tag which includes:

a low-resolution visual code that encodes general category information, for an information category, using a plurality of information-encoding regions; and a high-resolution visual code within at least one information-encoding region of the low-resolution visual code, wherein the high-resolution visual code encodes detailed information corresponding to the information category;

determining a level of resolution for the detected code;

decoding the code at the determined resolution level to obtain information; and presenting the information to a user, thereby allowing the user to navigate through the information associated with the physical object or location, wherein presenting the information involves displaying a user interface to the user that allows the user to select a portion of the code to be decoded at a resolution level that is higher than the present level of resolution.

18. The non-transitory computer-readable storage medium of claim 17, wherein the multi-resolution visual code is viewable from a variety of distances and provides multiple levels of resolution, wherein a code at each level of resolution encodes information corresponding to a different category level in an information hierarchy.

\* \* \* \* \*